(12) United States Patent
Swingler et al.

(10) Patent No.: US 9,003,326 B2
(45) Date of Patent: Apr. 7, 2015

(54) INDICATING INPUT FOCUS BY SHOWING FOCUS TRANSITIONS

(75) Inventors: Michael A. Swingler, Palo Alto, CA (US); Thomas J. O'Brien, San Jose, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 12/236,315

(22) Filed: Sep. 23, 2008

(65) Prior Publication Data
US 2010/0077345 A1    Mar. 25, 2010

(51) Int. Cl.
G06F 3/048     (2013.01)
G06F 3/0481    (2013.01)
G06F 9/44      (2006.01)

(52) U.S. Cl.
CPC ............ *G06F 3/0481* (2013.01); *G06F 9/4443* (2013.01)

(58) Field of Classification Search
USPC .................................................. 715/802, 767
See application file for complete search history.

(56) References Cited

U.S. PATENT DOCUMENTS

| | | | |
|---|---|---|---|
| 5,483,261 A | | 1/1996 | Yasutake |
| 5,488,204 A | | 1/1996 | Mead et al. |
| 5,687,331 A | * | 11/1997 | Volk et al. ................. 715/840 |
| 5,825,352 A | | 10/1998 | Bisset et al. |
| 5,835,079 A | | 11/1998 | Shieh |
| 5,880,411 A | | 3/1999 | Gillespie et al. |
| 6,072,485 A | * | 6/2000 | Barnes et al. ............... 715/802 |
| 6,177,945 B1 | * | 1/2001 | Pleyer ......................... 345/473 |
| 6,188,391 B1 | | 2/2001 | Seely et al. |
| 6,310,610 B1 | | 10/2001 | Beaton et al. |
| 6,323,846 B1 | | 11/2001 | Westerman et al. |
| 6,690,387 B2 | | 2/2004 | Zimmerman et al. |
| 7,015,894 B2 | | 3/2006 | Morohoshi |
| 7,184,064 B2 | | 2/2007 | Zimmerman et al. |
| 7,290,223 B2 | * | 10/2007 | Decombe .................... 715/853 |
| 7,415,475 B2 | * | 8/2008 | Zellweger et al. .............. 1/1 |
| 7,568,165 B2 | * | 7/2009 | Amadio et al. .............. 715/779 |
| 7,663,607 B2 | | 2/2010 | Hotelling et al. |
| 7,716,601 B2 | * | 5/2010 | Yoshida ...................... 715/821 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Doon Chow
*Assistant Examiner* — David Choi
(74) *Attorney, Agent, or Firm* — Morrison & Foerster LLP

(57) ABSTRACT

A GUI conveys the location of input focus to a user by a dynamic focus indicator that displays the path followed by input focus during a transition from one GUI component to another. A focus indicator is displayed at a first location having input focus. In response to the location of input focus shifting from the first location to a second location, a path is indicated from the first location to the second location and the focus indicator is displayed at the second location. The location of input focus may shift due to an input from the user, a request from an application associated with the GUI, or a timing event. The path is indicated by presenting an animation routine in which the focus indicator appears to traverse the path.

42 Claims, 10 Drawing Sheets

(56) References Cited

U.S. PATENT DOCUMENTS

| | | |
|---|---|---|
| 8,479,122 B2 | 7/2013 | Hotelling et al. |
| 2003/0004983 A1* | 1/2003 | Cohen .......................... 707/500 |
| 2005/0091604 A1* | 4/2005 | Davis ........................... 715/772 |
| 2005/0114786 A1* | 5/2005 | Decombe ...................... 715/764 |
| 2006/0026521 A1 | 2/2006 | Hotelling et al. |
| 2006/0197753 A1 | 9/2006 | Hotelling |
| 2006/0259853 A1* | 11/2006 | Zellweger et al. ......... 715/500.1 |
| 2006/0271874 A1* | 11/2006 | Raiz et al. .................... 715/767 |
| 2007/0050718 A1* | 3/2007 | Moore et al. .................. 715/744 |
| 2007/0092243 A1* | 4/2007 | Allen et al. ................... 396/121 |
| 2007/0139441 A1* | 6/2007 | Lucas et al. ................... 345/619 |
| 2007/0171450 A1* | 7/2007 | Yoshida ...................... 358/1.13 |
| 2007/0260994 A1* | 11/2007 | Sciammarella et al. ...... 715/769 |
| 2008/0204476 A1* | 8/2008 | Montague ..................... 345/661 |
| 2009/0327964 A1* | 12/2009 | Mouilleseaux et al. ...... 715/834 |
| 2010/0077345 A1* | 3/2010 | Swingler et al. .............. 715/802 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

Comp. A
905

Comp. B
910

Comp. C
915

Comp. D
920

Comp. E
925

FIG. 9

INDICATING INPUT FOCUS BY SHOWING FOCUS TRANSITIONS

BACKGROUND

1. Field of Art

The described invention generally relates to indicating the location of input focus within a computer's graphical user interface. More particularly, it relates to indicating the location of input focus within a graphical user interface by showing the transition of input focus between locations.

2. Description of the Related Art

Graphical user interfaces (GUIs) typically include selectable components (e.g., icons, pull-down menus with menu items, browsing tabs, etc.) that facilitate user interaction. In such interfaces, a component is said to have input focus if that component is currently selected to receive user input. As a user navigates between GUI components, input focus shifts from one component to the next.

Many selection methods exist by which a user may steer input focus within a GUI. These selection methods may be classified as either direct or indirect, depending on the level of control with which a user switches input focus between components. Direct selection methods are those in which a user controls the location of input focus in an absolute manner. Examples of direct selection methods include clicking a mouse with its pointer positioned over a component or physically tapping the location of a component via a touch-screen display. Indirect selection methods are those in which user input merely serves to shift input focus between components according to a pre-defined traversal sequence set by the GUI. An example of an indirect selection method includes striking tab or arrow keys on a keyboard until input focus has shifted to the desired component and subsequently executing a selective action, such as striking an enter or return key. Regardless of the exact implementation, an indirect selection method restricts a user's control over which component has input focus to shifting within some pre-defined traversal sequence.

When using an indirect method, users are heavily reliant on focus indicators to know which component currently has input focus. Hence, clearly conveying the location of input focus is critical to the user's experience. Conventional systems use a variety of focus indicators, such as displaying a ring around the component having the focus, altering the color scheme of the component, or highlighting text within the component. However, the focus indicators employed by conventional systems are static in nature, meaning they are strictly limited to modifying the component having input focus. No indication is provided to a user regarding the transition of input focus from one component to another. If a user action causes input focus to shift from a first component to a second component, the focus indicator simply disappears from the first component and appears for the second component, appearing to instantaneously "pop" between components. In many situations, such static methods make tracking the on-screen location of input focus difficult for a user. For example, a user may have difficulty identifying the component with focus when a large number of components are simultaneously displayed; when input focus shifts between distant components; when input focus shifts between components in a non-sequential or non-obvious manner; or when the GUI is physically small (such as on a handheld device).

For illustrative purposes, FIG. 1 presents a sample GUI 100 utilizing a static focus indicator 185. GUI 100 includes multiple viewing panes 105, 110, 115, numerous selectable components 120-180, and a static focus indicator 185. GUI 100 supports an indirect selection method whereby a user may change input focus from one of the components 120-180 to another according to a pre-defined focus traversal sequence by striking the tab key on a keyboard. The pre-defined focus traversal sequence is alphabetical, with focus proceeding from component A 120 to component B 125, from component B 125 to component C 130, etc., until component M 135 has input focus, from which focus next shifts to component A 120 and the sequence repeats. The pre-defined traversal sequence detailed above is merely a single illustrative example provided for the sake of this discussion. Many variations in the sequence are possible.

As shown, the static focus indicator 185 used by the GUI of FIG. 1 is located at component G 170. The static focus indicator 185 includes four crop-marks surrounding component G 170. The static focus indicator 185 may be thought of as a rectangle surrounding component G 170, wherein only the vertices of the rectangle are visible to a user so as to avoid cluttering the GUI 100 unnecessarily. In the example operational state shown by FIG. 1, if the user were to strike the tab key, input focus would shift from component G 170 to component H 160.

Due to its static nature, this shift comprises the static focus indicator 185 ceasing to surround component G 170 and immediately commencing to surround component H 160. Hence, it may appear to the user as though the focus indicator 185 has instantaneously "popped" from component G 170 to component H 160. At any given instant, the static focus indicator 185 provides information about only that component 120-180 presently having input focus.

The user may have difficulty tracking the location of the static focus indicator 185 for a number of transitions, such as between component G 170 and component H 160. These two components 170, 160 are not spatially adjacent neighbors, are on opposite sides of the GUI 100, and do not share a viewing pane 115. Hence, this transition dictated by the pre-defined focus traversal sequence may seem illogical to a user. After striking the tab key, it may take the user some amount of time to scan the GUI 100 for the new location of the static focus indicator 185. The specific requirements placed on a GUI 100 and/or insufficient planning by software developers often give rise to illogical pre-defined focus traversal sequences wherein many transitions may cause a user employing an indirect selection method to lose track of a static focus indicator 185 and waste time locating it.

SUMMARY

The present invention enables a GUI to convey the location of input focus to a user using a dynamic focus indicator that indicates the path followed by input focus during a transition from one GUI component to another. The user can track the location of input focus within the GUI based at least in part on these transitions.

In one embodiment, a GUI displays a focus indicator at a first location having input focus. In response to the shifting input focus, a path is indicated from the first location to the second location and the focus indicator is displayed at the second location. In one embodiment, the location of input focus may shift due to an input from the user, a request from an application associated with the GUI, or a timing event. In one embodiment, the path is indicated by presenting an animation routine in which the focus indicator appears to traverse the path.

In one embodiment, presenting an animation routine comprises calculating data structures corresponding to the dynamic focus indicator at various locations along the path. In one embodiment, a data structure defines a graphical element. The dynamic focus indicator is comprised of one or more graphical elements of any shape or color suitable for conveying the location of input focus. In one embodiment, the dynamic focus indicator is rectangular and comprises four graphical elements corresponding to the four vertices of a rectangle circumscribing a location having input focus. In one embodiment, the dynamic focus indicator comprises a plurality of graphical elements surrounding a location having input focus which move from the first location to the second location. In another embodiment, the dynamic focus indicator comprises a magnification of a location having input focus relative to other locations within the GUI. In yet another embodiment, the dynamic focus indicator comprises lines between the first location and the second location.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 illustrates the operation of a dynamic focus indicator in accordance with one embodiment of the present invention.

FIG. 9 is a graphical representation of a dynamic focus indicator in accordance with a fourth embodiment of the present invention.

DETAILED DESCRIPTION

The figures and the following description relate to embodiments of the invention by way of illustration only. Alternative embodiments of the structures and methods disclosed here may be employed without departing from the principles of what is claimed.

Reference will now be made in detail to several embodiments, examples of which are illustrated in the accompanying figures. Wherever practicable similar or like reference numbers may be used in the figures and may indicate similar or like functionality. The figures depict embodiments of the disclosed systems (or methods) for purposes of illustration only. One skilled in the art will readily recognize from the following description that alternative embodiments of the structures and methods illustrated herein may be employed without departing from the principles described herein.

Indicating Input Focus Transitions

Figure 1:
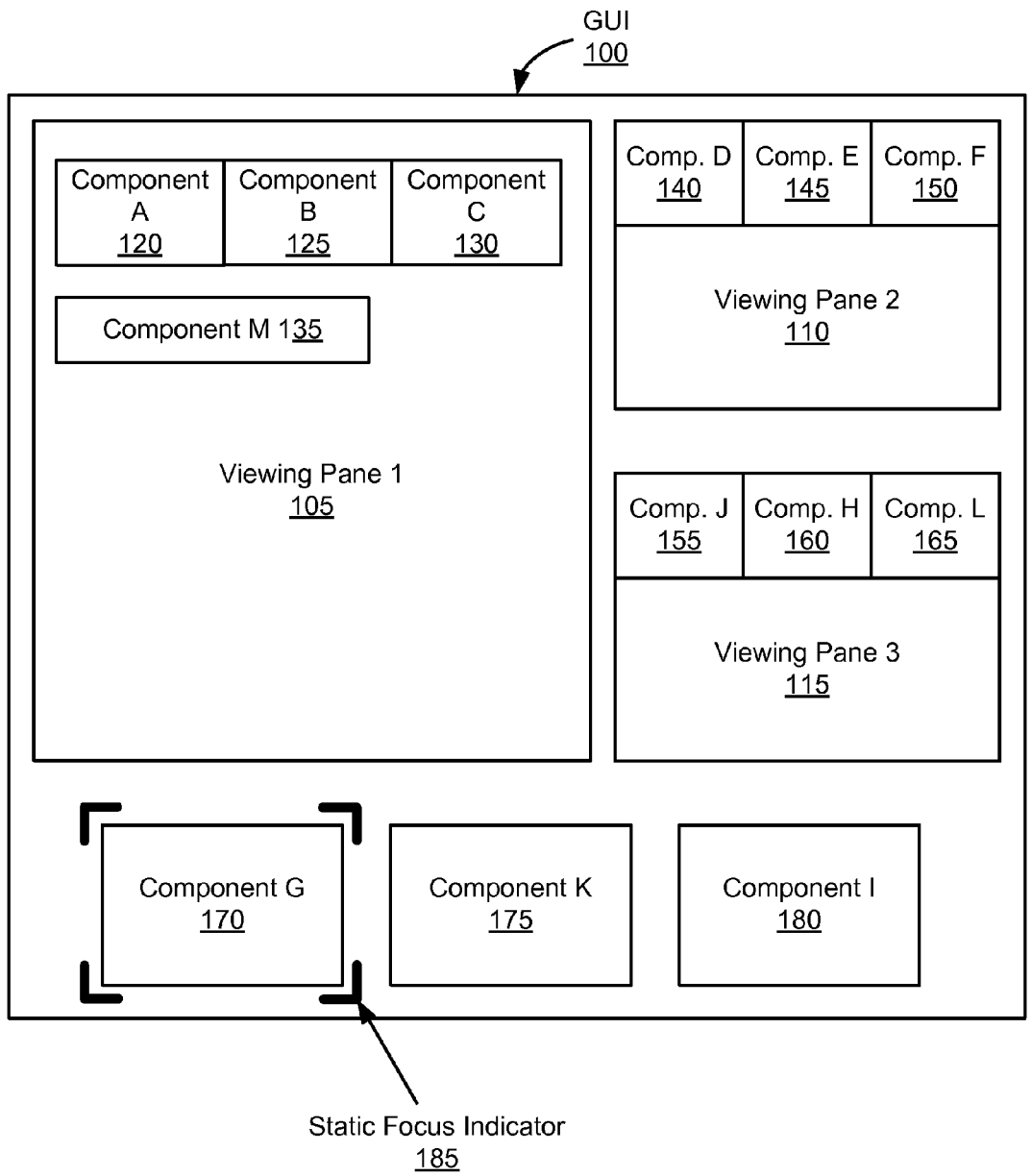
FIG. 1 illustrates a GUI comprising a static focus indicator.
Figure 2:
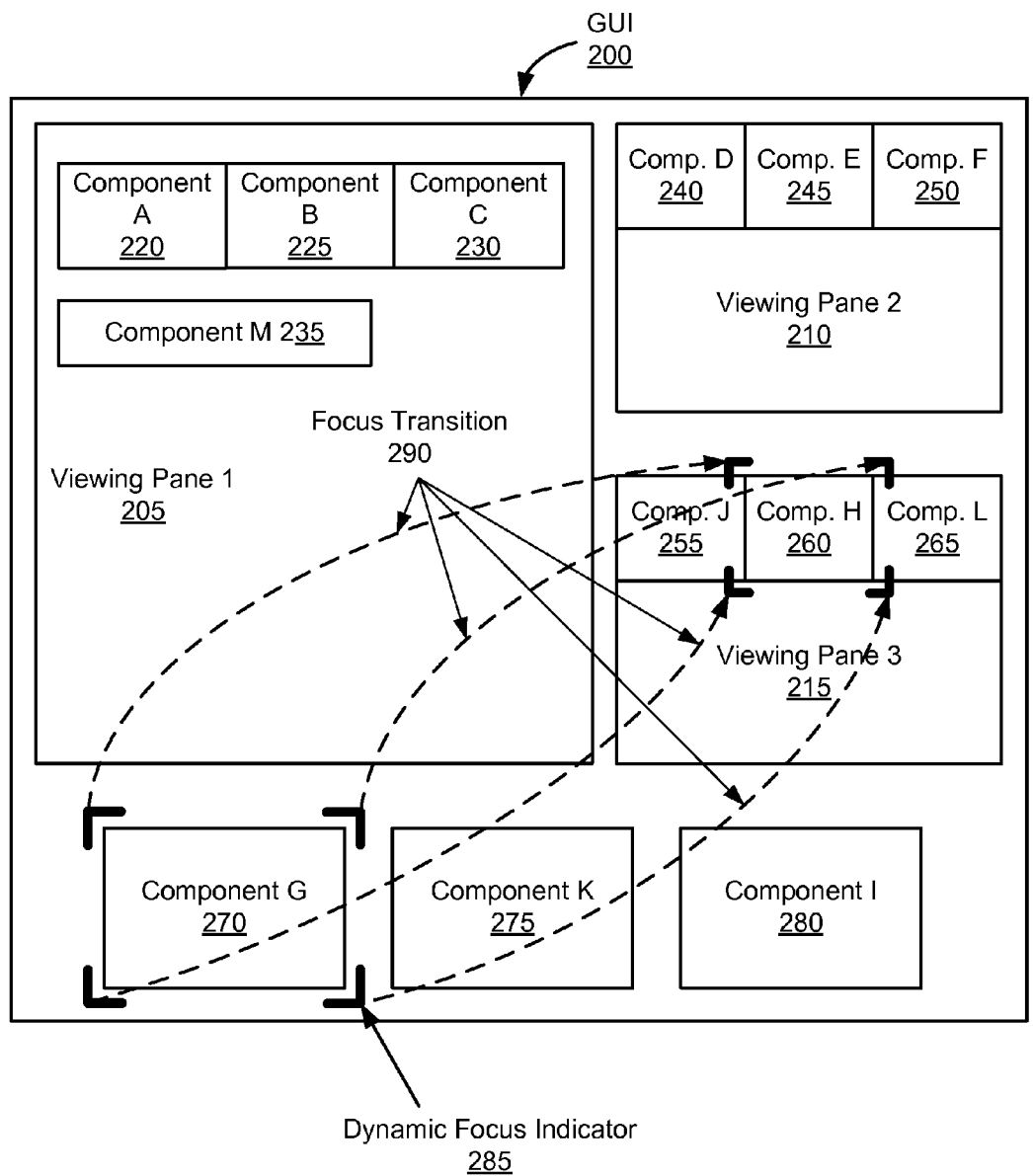
FIG. 2 illustrates a GUI comprising a dynamic focus indicator in accordance with one embodiment of the present invention.

Referring to FIG. 2, in one embodiment, focus indicators 285 are dynamic and convey not only the present location of input focus, but also the path followed by input focus during a transition from one component to another. One such embodiment is shown in FIG. 2, wherein the GUI 200 includes a dynamic focus indicator 285 to indicate focus transition 290.

GUI 200 also comprises multiple viewing panes 205, 210, 215 and numerous selectable components 220-280. GUI 200 supports an indirect selection method whereby input focus shifts from one of the components 220-280 to another according to a pre-defined focus traversal sequence. Examples of shift-causing events include a user input (e.g., the user striking a key on a keyboard) or an event internal to an application associated with the GUI (e.g., a timeout or need for user input at a particular component). The pre-defined focus traversal sequence is alphabetical, with focus proceeding from component A 220 to component B 225, from component B 225 to component C 230, etc., until component M 235 has input focus, from which focus next shifts to component A 220 and the sequence repeats. The pre-defined traversal sequence detailed above is merely a single illustrative example provided for the sake of this discussion. Many variations in the sequence are possible.

As shown, the dynamic focus indicator 285 used by the GUI 200 of FIG. 2 is located at component G 270. The dynamic focus indicator 285 includes four crop-marks surrounding component G 270. The dynamic focus indicator 285 may be thought of as a rectangle surrounding component G 270, wherein only the vertices of the rectangle are visible to a user so as to avoid cluttering the GUI 200 unnecessarily. For clarity, we describe a rectangular dynamic focus indicator. However, the specific appearance of the dynamic focus indicator 285 is a design choice, graphical elements of any shape (e.g., elliptical or circular) or color may be used to convey conveying the location of input focus.

In the example operational state shown by FIG. 2, if the user were to strike the tab key, input focus would shift from component G 270 to component H 260. Thanks to the dynamic focus indicator 285, the user is able to clearly see the focus transition 290 as input focus shifts between component G 270 and component H 260. Specifically, the user sees the dynamic focus indicator 285 expand and move across the GUI 200 towards component H. The four crop-marks arc away from the vertices of component G, ultimately contracting and settling around the four vertices of component H. The dynamic focus indicator 285 indicates the focus transition 290 via similar movements as focus shifts between all components 220-280 of the GUI 200. In this way, the dynamic focus indicator 285 serves to visually guide a user through the pre-defined focus traversal sequence of the GUI 200. In each transition between components, some set amount of time elapses between the dynamic focus indicator 285 initially expanding and moving away from the first component and finally settling around the subsequent component (e.g., 0.85 seconds).

Although component G 270 and component H 260 are not spatially adjacent neighbors, are on opposite sides of the GUI 200, and do not share a viewing pane 215, the user is able to easily follow the movement of input focus due to the dynamic focus indicator 285. After striking the tab key, the focus transition 290 is clearly indicated by the dynamic focus indicator 285 and the user need not waste time searching for the new location of input focus.

FIGS. 3A-3F detail the movement undertaken by a dynamic focus indicator 285 to indicate a focus transition 290 according to one embodiment. FIGS. 3A-3F present a chronological series of panels, with the time sequence of the panels corresponding to their alphabetical order.

Figures 3A, 3B, 3C, 3D, 3E, 3F:
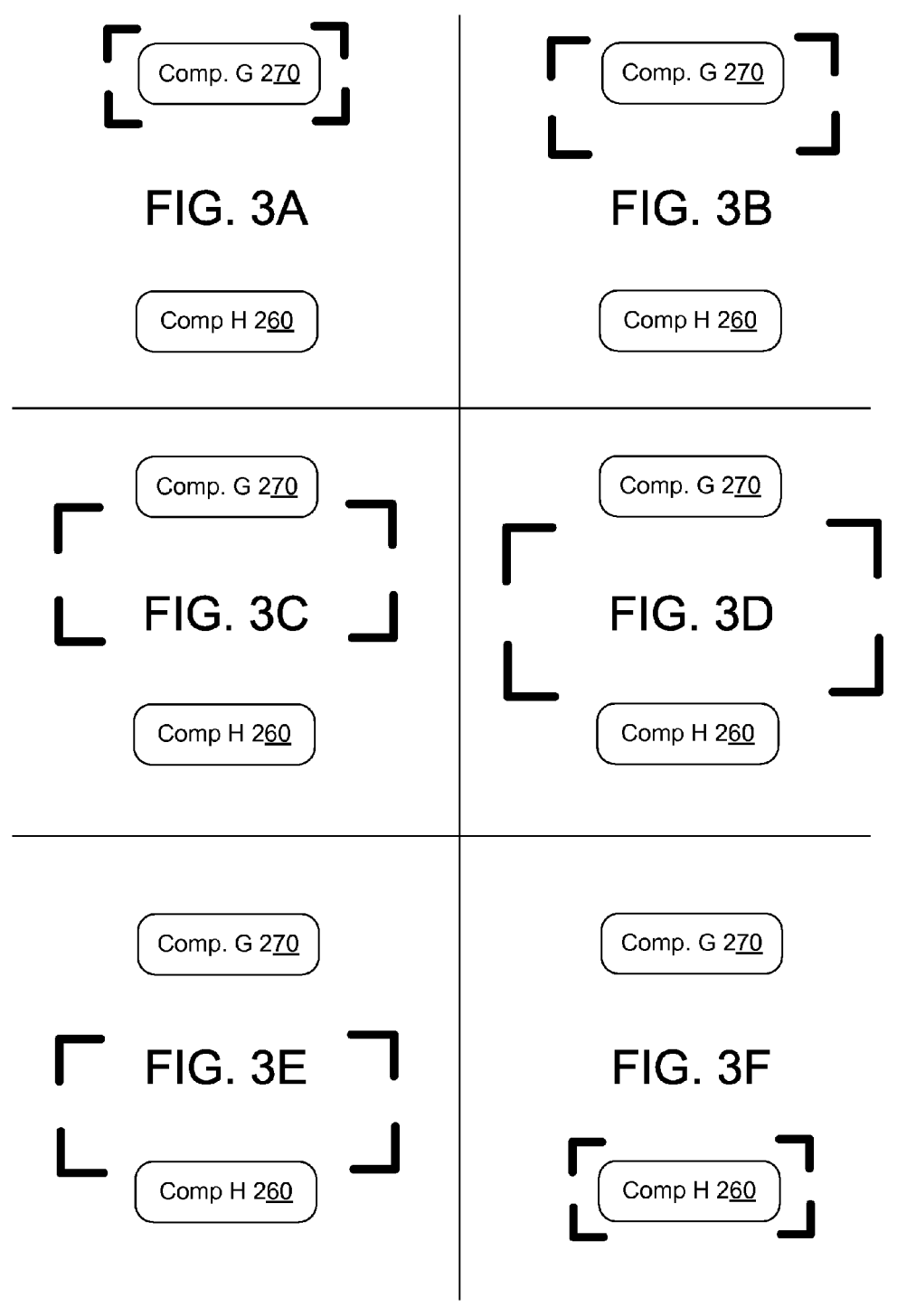

In FIG. 3A, which corresponds to the initiation of an input focus shift, four crop-marks surround component G 270. In FIG. 3B, which corresponds to a time just after the input focus shift was initiated, the same four crop-marks have expanded slightly and moved towards component H 260. This expansion and motion towards component H 260 continues in FIGS. 3C and 3D. In FIG. 3E, the four crop-marks have begun to contract as they are nearing component H 260. In FIG. 3F, which corresponds to a time just after the focus transition 290 has completed, the four crop-marks surround component H 260.

In some embodiments, the four crop-marks may stay visible around component H 260 throughout the time that component H 260 has input focus. In other embodiments, the four crop-marks may disappear some time after settling around component H 260, reappearing upon the initiation of a subsequent input focus shift. In various embodiments, a specified time elapses between FIG. 3A and FIG. 3F (e.g., 0.85 seconds), allowing a user to easily follow the focus transition 290.

In one embodiment, the dynamic focus indicator 285 does not move between components at a constant speed as it indicates focus transitions 290. Rather, the dynamic focus indicator 285 may follow a "slow, fast, slow" pattern of motion. For example, the dynamic focus indicator 285 may leave component G 270 at an initial speed. Its speed may then increase up to some maximum level, at which point its speed decreases until the transition 290 is complete, and the dynamic focus indicator 285 has reached component H 260.

This "slow, fast, slow" pattern improves the ability of the human eye to follow the dynamic focus indicator 285 throughout the focus transition 290. Objects in the physical world do not immediately start or stop moving, but rather need to overcome inertia. They start moving slowly and accelerate then slow down gradually and decelerate. The human eye naturally tracks motion by being attracted to accelerating targets, locking onto them, and following them as they decelerate. Thus, a visual effect that starts moving at its maximum speed immediately can fail to catch the eye. Similarly, a visual effect that stops immediately can cause the eye to overshoot the target in the direction of the original motion.

Despite expanding to various extents and moving at various speeds during different focus transitions 290, the dynamic focus indicator 285 may still complete its journey in the same amount of time (e.g., 0.85 seconds) for all focus transitions 290. Further, the limits and rates of the dynamic focus indicator's 285 expansion and pace may be proportional to the distance between the two components involved in the focus transition 290. The dynamic focus indicator 285 may expand more and move faster for transitions between relatively distant components. Conversely, the dynamic focus indicator 285 may expand less and move slower for transitions between relatively near components. This provides additional feedback to a user regarding the nature of the focus transition 290 induced via an indirect selection method.

In some instances, a user employing an indirect selection method may initiate multiple focus transitions 290 in fairly rapid succession. In one embodiment, the dynamic focus indicator 285 adjusts its behavior in response to such multi-transition scenarios. For example, while navigating the GUI 200 of FIG. 2, a user may strike the tab key three times very rapidly. This would cause input focus to shift from component G 270 to component H 260 to component I 280 to component J 255. However, the dynamic focus indicator may leave component G 270 and settle around component J 255 while avoiding the unnecessary intermediate steps of settling around component H 260 or component I 280.

In the above example, the first tab key strike causes the dynamic focus indicator to begin moving according to the first focus transition 290 from component G to component H. However, the second tab key strike occurs prior to the completion of this first focus transition 290 (e.g., less than 0.85 seconds after the first tab key strike). In response to the second tab key strike, the dynamic focus indicator 285 redirects its motion, ceasing to aim towards component H 260 and beginning to aim towards the new target, component I 280. Additionally the expansion of the dynamic focus indicator 285 is amplified, indicating to the user that multiple focus transitions 290 have been initiated in rapid succession. In response to the third tab key strike, the dynamic focus indicator again undergoes further expansion and redirects its motion, this time to target component J 255. As illustrated by the above example, additional expansion of the dynamic focus indicator 285 may serve as a feedback mechanism, alerting a user that multiple focus shifts have been executed. This is helpful as the user may otherwise be unaware that multiple focus shifts have taken place, perhaps because keys have been struck accidentally. In such a way, the dynamic focus indicator 285 further enhances the user's ability to track the location of input focus within the GUI 200, particularly in multi-transition scenarios.

In some embodiments, a user is allowed to provide input to control various properties of the behavior of the dynamic focus indicator 285 with the GUI 200. By changing different settings, the user can increase or decrease the duration of focus transitions 290 or increase or decrease the duration for which the dynamic focus indicator 285 remains visible when a focus transition 290 is not occurring. The user can also adjust the appearance of the dynamic focus indicator.

Implementation of Dynamic Focus Indicators

Figure 4:
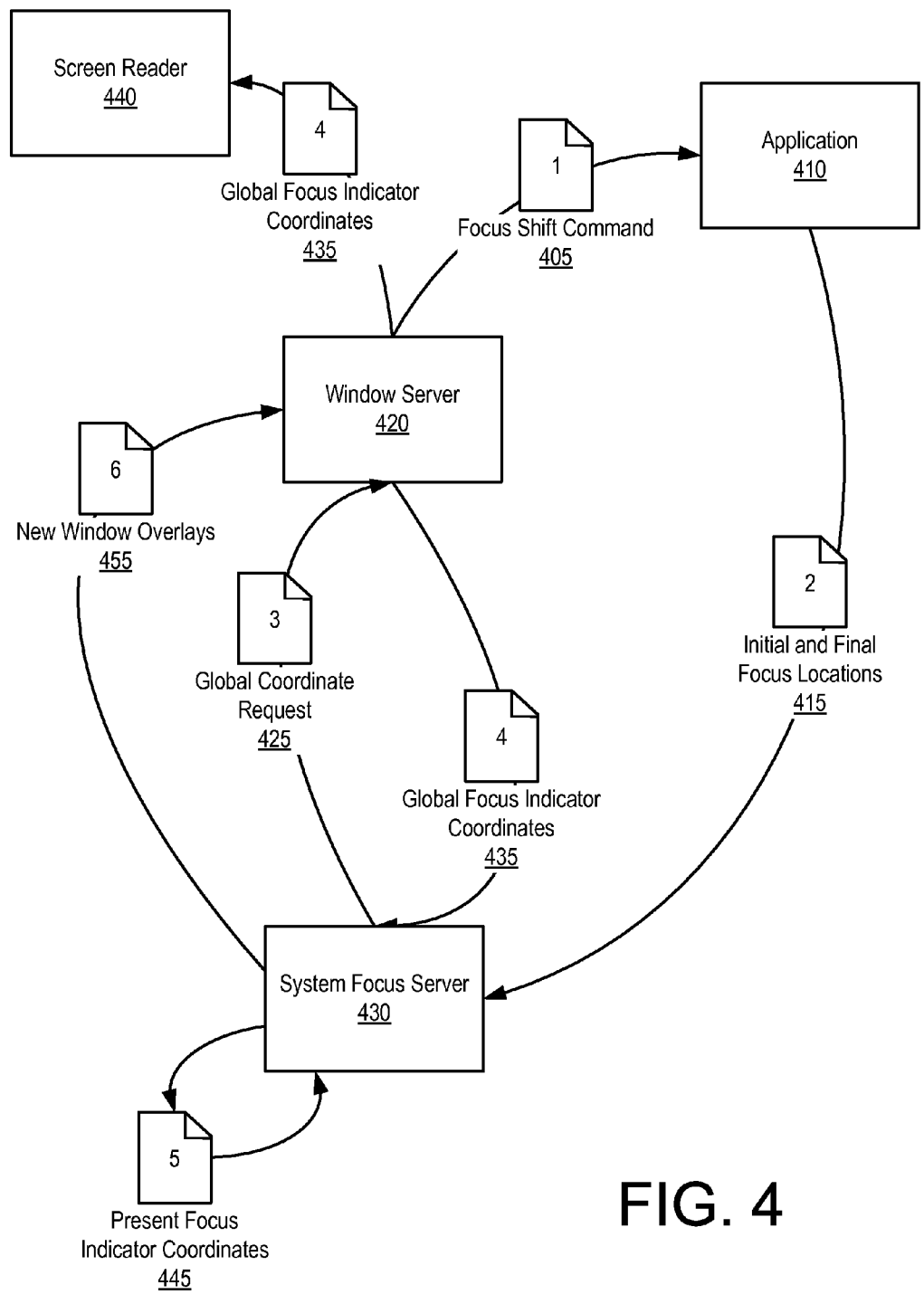
FIG. 4 is a block diagram of a system for providing a dynamic focus indicator in accordance with one embodiment of the present invention.

FIG. 4 illustrates a system for processing a focus transition 290 using a dynamic focus indicator 285 according to one embodiment. The illustrated system includes an application 410, a window server 420, a system focus server 430, and a screen reader 440. In one embodiment, the application 410, the window server 420, the system focus server 430, and the screen reader 440 are one or more computer program modules stored on one or more computer readable storage mediums and executing on one or more processors. Additionally, the application 410, the window server 420, the system focus server 430, and the screen reader 440 are communicatively coupled to one another to at least the extent that data may be passed between them. In one embodiment, the window server 420, the system focus server 430, and the screen reader 440 are executing as one or more parts of an operating system on a personal computer. The application 410 is executing on the same personal computer and is managed by the operating system. The application 410 includes the GUI 200 of FIG. 2.

When a user, using an indirect selection method, issues a command to shift input focus within the GUI 200 that is part of the application 410, the window server 420 passes this command 405 to the application 410. The user may issue the focus shift command 405 by striking a tab key on a keyboard. The particular method by which a focus shift command 405 is issued varies between embodiments. Once it has received the focus shift command 405, the application 410 responds by sending to the system focus server 430 the initial and final focus locations 415 within the GUI 200 for the upcoming focus transition 290. For example, in the focus transition 290 depicted in FIG. 2, the application 410 would send to the window server 420 the coordinates for two rectangles: the rectangle corresponding to component G 270 (the initial location of the dynamic focus indicator 285) and the rectangle corresponding to component H 260 (the final location of the dynamic focus indicator 285). In some embodiments, the pre-defined traversal sequence of the GUI 200 resides solely within the application 410, thereby requiring that the initial and final focus locations 415 are provided by the application 410.

Depending on the specific embodiment, the initial and final focus locations 415 may be provided by the application 410 using either local or global screen coordinates. In some embodiments, the system focus server 430 requires global screen coordinates, but the application 410 sends the initial and final focus locations 415 using local screen coordinates. In such embodiments, the system focus server 430 sends a global coordinate request 425 to the window server 420. The window server 420 converts the local coordinates into their global equivalents and sends global focus indicator coordinates 435 corresponding to the initial and final focus locations 415 to the system focus server 430.

In one embodiment, the window server also sends the global focus indicator coordinates 435 to the screen reader 440. The screen reader 440 is a software application that identifies and interprets what is being displayed on a screen for a user with special needs. The screen reader 440 is an assistive technology and may facilitate enhanced screen magnification options, verbal descriptions of the display, Braille outputs, or other alternative representations of the display. Users with special needs who utilize screen readers 440 often employ an indirect selection method when navigating a GUI 200. In one embodiment, the screen reader 440 is VoiceOver™ from Apple, Inc. of Cupertino, Calif.

Once the system focus server 430 has the global focus indicator coordinates 435 corresponding to the initial and final focus locations 415 for the focus transition 290 being processed, it uses animation routines to internally handle the intermediate states related to the on-screen location and characteristics of the dynamic focus indicator 285. As such, in between its initial position before the focus transition 290 and its final position after the focus transition 290, the on-screen location and characteristics of the dynamic focus indicator 285 are controlled by the system focus server 430.

To handle the intermediate states of the dynamic focus indicator 285, steps taken by the system focus server 430 include storing the present focus indicator coordinates 445, determining the appropriate on-screen location and characteristics of the dynamic focus indicator 285 for the subsequent intermediate state, and sending to the window server 420 a new window overlay 455 corresponding to the subsequent intermediate state. Upon receiving a new window overlay 455, the window server 420 ensures that the dynamic focus indicator is properly rendered on-screen. Once a new window overlay 455 has been sent to the window server 420, the associated dynamic focus indicator 285 coordinates are stored as the present focus indicator coordinates 445, the appropriate on-screen location and characteristics of the dynamic focus indicator 285 for the subsequent intermediate state are determined, and the corresponding new window overlay 455 is sent to the window server 420. This process is repeated within the system focus server 430 until the dynamic focus indicator 285 reaches its final position, thereby completing the focus transition 290.

Figure 5:
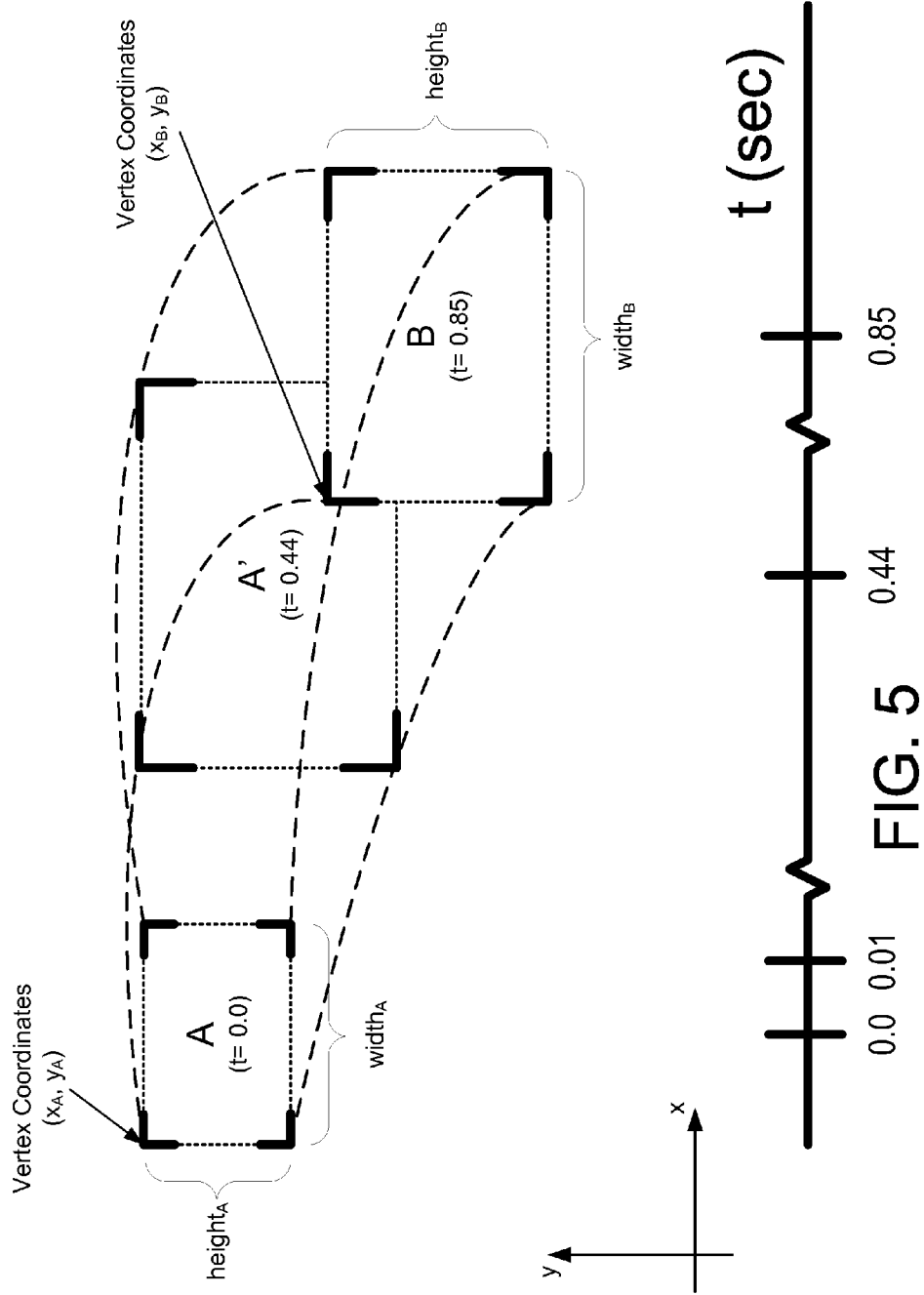
FIG. 5 illustrates the operation of a dynamic focus indicator in accordance with one embodiment of the present invention.

FIG. 5 details the steps taken by the system focus server 430 to process the intermediate states of the dynamic focus indicator 285 during a focus transition 290. Position A represents the initial position of the dynamic focus indicator 285 prior to the focus transition 290. Position B represents the final position of the dynamic focus indicator 285 after the focus transition 290. In the embodiment depicted in FIG. 5, the duration of the focus transition 290 is 0.85 seconds. Thus, position A corresponds to a time of 0.0 seconds, and position B corresponds to a time of 0.85 seconds. This is reflected in the timeline at the bottom of FIG. 5.

Position A' represents an intermediate state of the dynamic focus indicator 285 that corresponds to a time of 0.44 seconds into the focus transition 290. It may be observed that at position A', the dynamic focus indicator 285 has expanded relative to both position A and position B. For illustrative purposes, FIG. 5 depicts an embodiment in which a new intermediate state is created for every 0.01 seconds of the timeline. Thus, position A' corresponds to the forty-fourth intermediate state of the focus transition 290. The respective paths of the four crop-marks of the dynamic focus indicator 285 from position A to position B are demonstrated by the four dashed arcs between each position of FIG. 5.

As shown in FIG. 5, the dynamic focus indicator 285 comprises four crop-marks corresponding to the four corners of a rectangle. The rectangle to which the crop-marks correspond is represented by the dotted lines between the four crop-marks at each position of FIG. 5. Hence, in one embodiment, for any instant in time, the on-screen location and characteristics of the dynamic focus indicator 285 may be specified in terms of the corresponding rectangle. At position A, the rectangle corresponding to the dynamic focus indicator 285 has a vertex with coordinates ($x_A$ and $y_A$), a width (width$_A$), and a height (height$_A$). A single data structure (rect$_A$) comprising $x_A$, $y_A$, width$_A$, and height$_A$ may be created to represent the initial on-screen location and characteristics of the dynamic focus indicator 285 at position A. Similarly, a single data structure (rect$_B$) comprising $x_B$, $y_B$, width$_B$, and height$_B$ may be created to represent the final on-screen location and characteristics of the dynamic focus indicator 285 at position B.

The system focus server 430 uses (i) the rectangle for the current intermediate state, (ii) the rectangle for the final state, and (iii) the time remaining in the focus transition 290 to calculate the next intermediate state. For example, at time 0.0 seconds, the system focus server 430 uses rect$_A$, rect$_B$, and 0.85 seconds to calculate a first intermediate rectangle. This first intermediate rectangle specifies the on-screen location and characteristics of the intermediate position A (0.01 seconds into the focus transition 290). Similarly, at time 0.44 seconds, the system focus server 430 uses rect$_{A'}$, rect$_B$, and 0.41 seconds, the time remaining in the focus transition, to calculate a forty-fifth intermediate rectangle. This forty-fifth intermediate rectangle specifies the on-screen location and characteristics of the intermediate state immediately following position A'. This process is repeated throughout the focus transition 290 until rect$_B$ is calculated and the focus transition is complete 0.85 seconds after it was initiated. Each time a new intermediate state is determined, the system focus server 430 sends the window server 420 a new window overlay 445 comprising the information necessary for the window server 420 to ensure that the dynamic focus indicator 285 is properly displayed to a user.

Many data structures for representing rectangles and other graphic elements in terms of screen coordinates are well known in the art, and the methods depicted within FIG. 5 may be readily adapted to utilize such alternate data structures and/or other graphic elements to implement a dynamic focus indicator 285. Furthermore, the methods depicted within FIG. 5 are readily adapted to focus transitions 290 having any duration deemed appropriate by the implementer; the 0.85 seconds duration used in this example is merely illustrative.

Dynamic Focus Indicators

Many options exist for graphically representing a dynamic focus indicator 285. In FIGS. 2, 3, and 5, a dynamic focus indicator 285 comprises four crop-marks. FIGS. 6-10 illustrate other sample graphical representations of a dynamic focus indicator 285. In some embodiments, an application 410 may include a GUI 200 wherein a user may select the particular graphical representation used from a list or may create a custom graphical representation.

Figure 6:
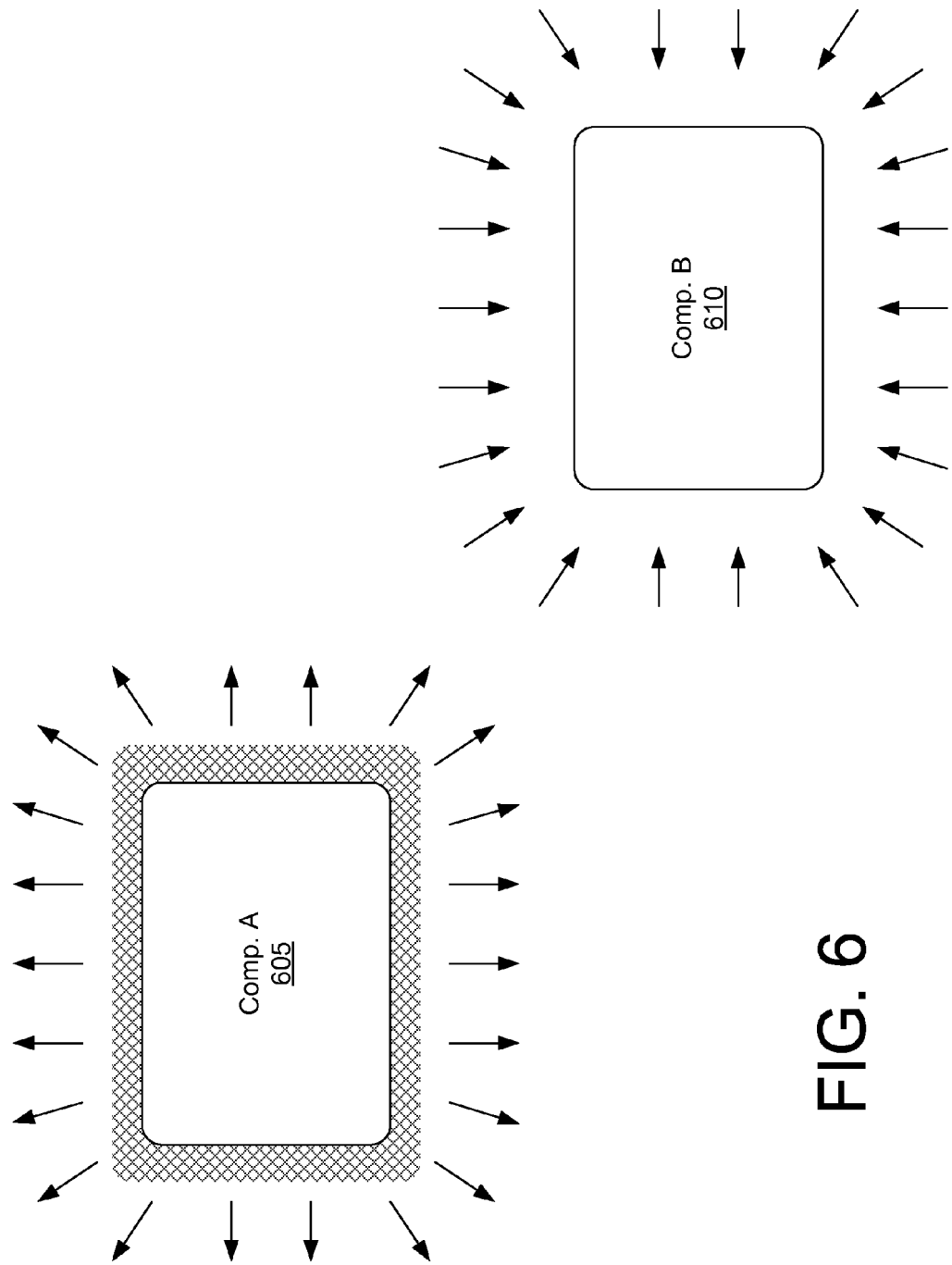
FIG. 6 is a graphical representation of a dynamic focus indicator in accordance with a first embodiment of the present invention.

The graphical representation depicted in FIG. 6 may be referred to as "fuzz explosion." In fuzz explosion, focus fuzz surrounds a component currently having input focus, represented by component A 605. In one embodiment, focus fuzz is a single graphical element or collection of graphical elements that present a fuzzy appearance to a user. When surrounding a component, focus fuzz causes the component to appear to a user as though its perimeter is coated with fuzz. The thickness and color of focus fuzz are variable design choices. Upon the initiation of a focus transition 290, the focus fuzz appears to a user to separate and move away, for example as if exploding away from a first location at component A 605, as indicated by the outgoing arrows around component A 605. During the focus transition 290, the fuzz drifts towards the immediately subsequent component in the pre-defined traversal sequence, a second location represented by component B 610, and converges and surrounds its perimeter, as indicated by the ingoing arrows around component B 610. After a specified focus transition duration (e.g., 0.85 seconds), the focus fuzz has completely resettled around component B 610.

Figure 7:
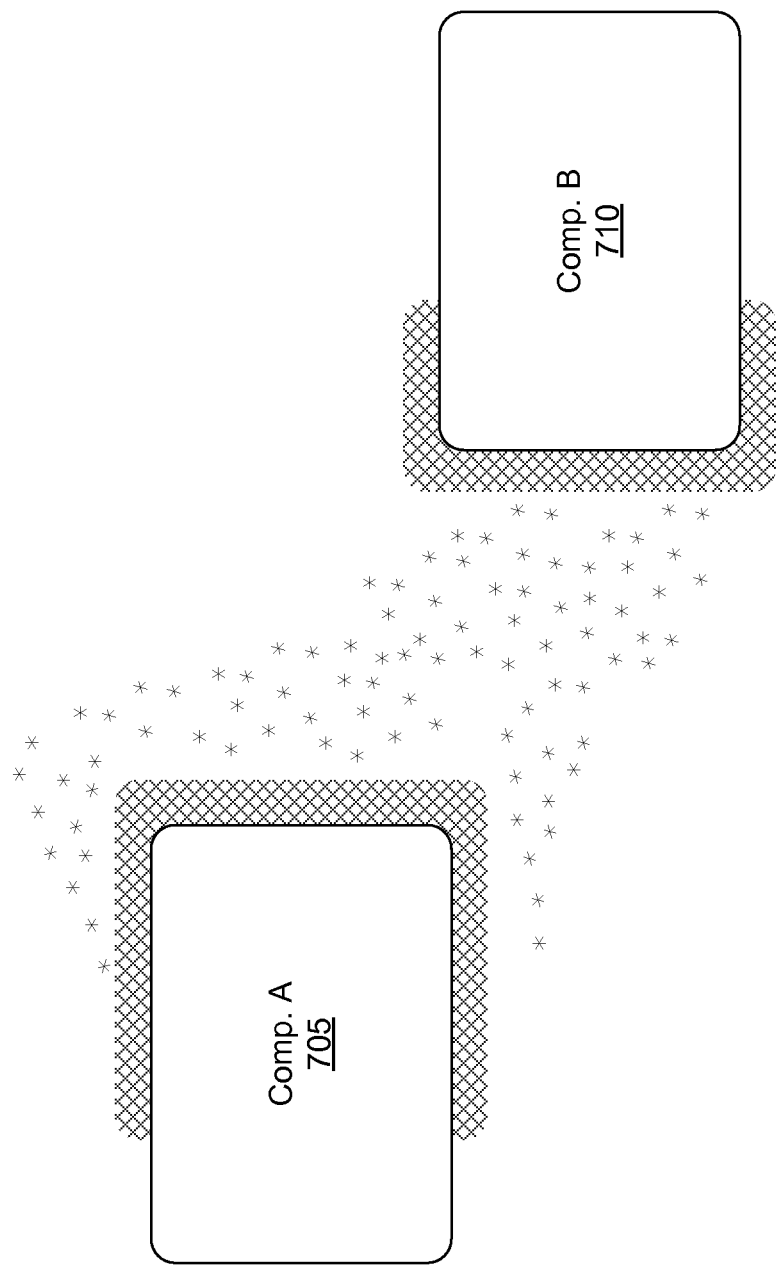
FIG. 7 is a graphical representation of a dynamic focus indicator in accordance with a second embodiment of the present invention.

The graphical representation depicted in FIG. 7 may be referred to as "dandelion drift." In dandelion drift, focus fuzz surrounds a component currently having input focus. FIG. 7 depicts a time roughly corresponding to the midpoint of a focus transition 290 from a first location at component A 705 to a second location at component B 710. Upon the initiation of a focus transition 290, the focus fuzz begins to sequentially separate from component A 705. To a user, this may be reminiscent of the seeds of a dandelion plant being blown away from a flower. Throughout the focus transition 290, the fuzz moves or drifts towards the immediately subsequent component in the predefined traversal sequence, represented by component B 710, and settles around its perimeter, sequentially surrounding the second location. After a specified focus transition duration (e.g., 0.85 seconds), the focus fuzz has completely resettled around component B 710.

Figure 8:
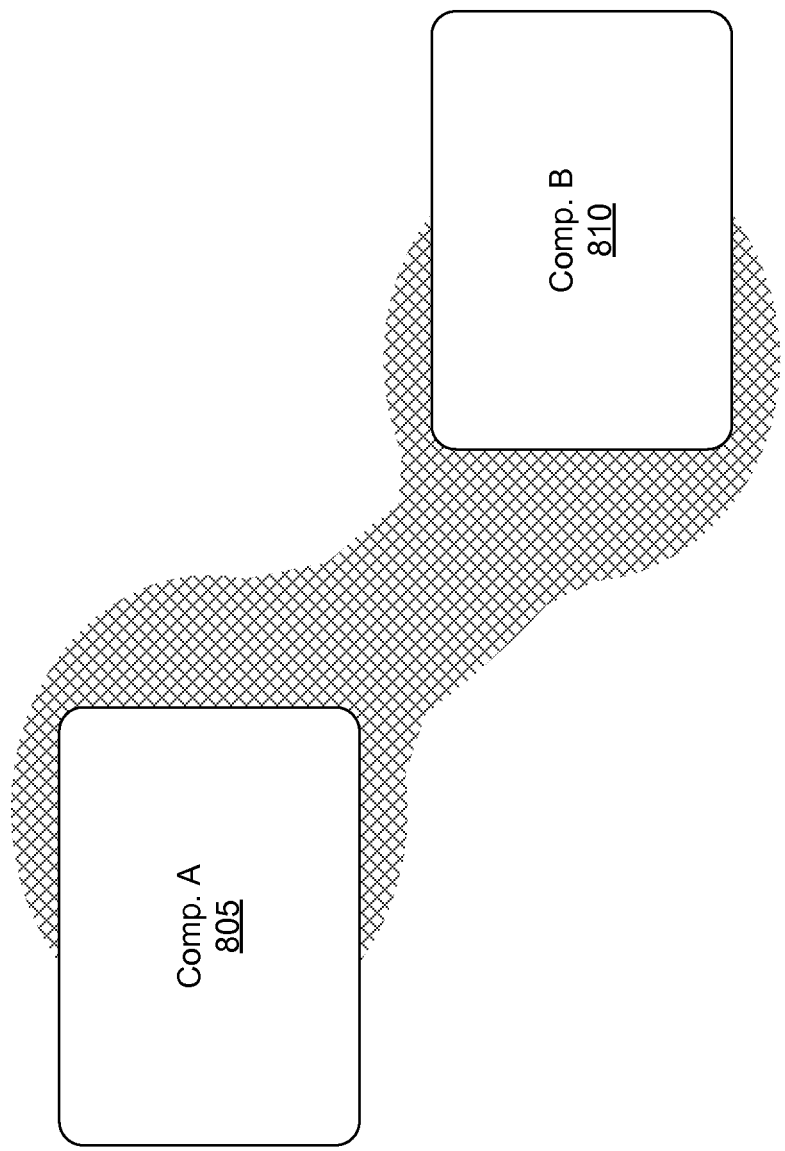
FIG. 8 is a graphical representation of a dynamic focus indicator in accordance with a third embodiment of the present invention.

The graphical representation depicted in FIG. 8 may be referred to as "flow." In flow, focus fuzz again surrounds a component currently having input focus. FIG. 8 depicts a time roughly corresponding to the midpoint of a focus transition 290 from a first location at component A 805 to a second location at component B 810. Throughout the focus transition 290, the fuzz appears to flow as a contiguous mass towards the immediately subsequent component in the predefined traversal sequence, represented by component B 810, proceeding along its outline until it has surrounded its perimeter. It may appear to a user that component B 810 is pulling the focus fuzz away from component A. After a specified focus transition duration (e.g., 0.85 seconds), the focus fuzz has completely surrounded component B 810.

The graphical representation depicted in FIG. 9 may be referred to as "magnify." In magnify, it may appear to a user that a magnifying glass is positioned over a location of input focus such that the location having input focus appears magnified relative to other locations within the GUI 200. As a focus transition 290 takes place, it may appear to the user that the magnifying glass moves across the screen, with different portions of elements within the GUI 200 becoming magnified in succession. For example, FIG. 9 depicts a time roughly corresponding to the midpoint of a focus transition 290 from a first location at component C 915 to a second location at component D 920. At this point, the bottom portion of component C 915 is magnified, and the top portion of component D 920 is magnified. When the focus transition is complete, only component D will be magnified; at that point, component D will be magnified in its entirety.

Figure 10:
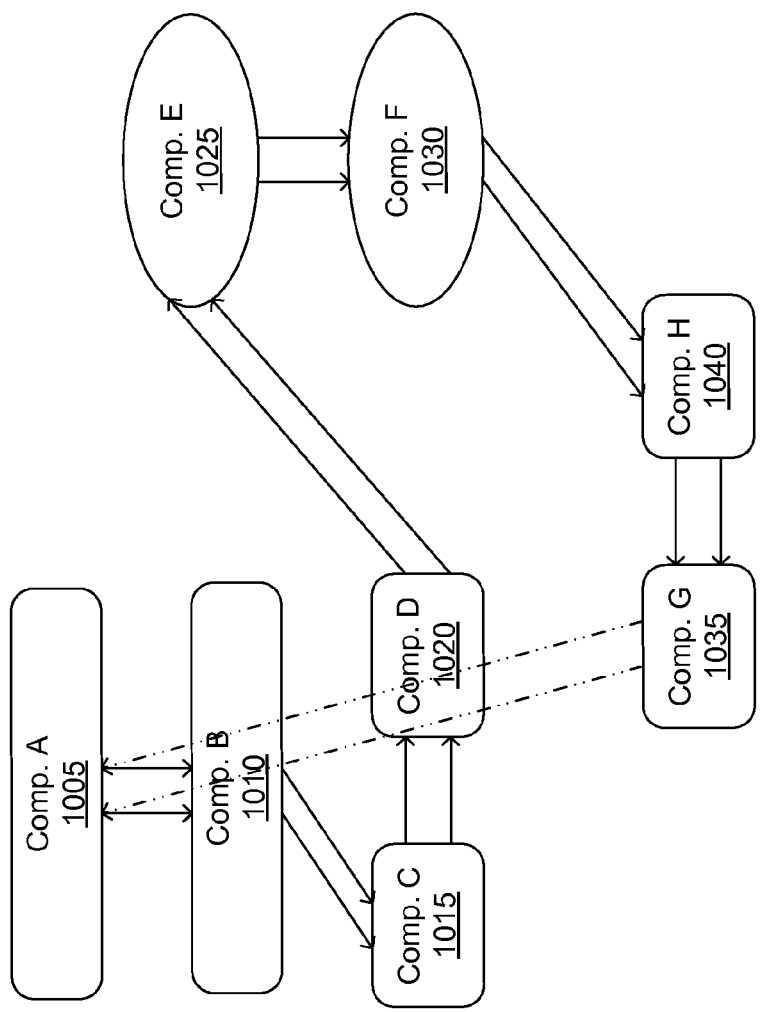
FIG. 10 is a graphical representation of a dynamic focus indicator in accordance with a fifth embodiment of the present invention.

The graphical representation depicted in FIG. 10 may be referred to as "focus lines." In focus lines, a focus transition 290 is indicated to a user by the on-screen rendering of lines between components involved in the focus transition 290. In such a way, focus lines may make the pre-defined traversal sequence of a GUI 200 particularly apparent to the user. For example, FIG. 10 depicts a multi-transition scenario in which input focus was originally located at component G 1035, but a user commanded eight focus shifts in very rapid succession, thereby causing input focus to shift through the entire pre-defined traversal sequence and ultimately return to component G 1035. Thus, eight sets of focus lines appear in FIG. 10 indicating the pre-defined traversal sequence. Additionally, in some embodiments of focus lines, the focus lines between two components may fade some time after the occurrence of the corresponding transition to avoid unnecessarily cluttering the GUI 200. This is illustrated in FIG. 10 by the dashed focus lines between component G 1035 and component A 1005. This was the first of the eight transitions to occur and, as such, the associated focus lines have begun to fade away while the other 7 sets of focus lines remain well-defined. In various embodiments, the focus lines take many forms, including pairs of focus lines as shown in FIG. 10, single focus lines, focus lines with or without arrows, focus lines which do or do not fade after some time, or focus lines which change color over time.

Additional Considerations

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for indicating a location of an input focus within a graphical user interface, the method comprising:
    displaying a focus indicator at a first location within the graphical user interface, the first location having input focus, the focus indicator substantially surrounding the first location;
    responsive to the location of input focus shifting from the first location to a second location within the graphical user interface, indicating a path from the first location to the second location by presenting a first animation routine in which the focus indicator traverses the path and further comprising expanding the focus indicator during a first portion of the path and contracting the focus indicator during a second portion of the path wherein the focus indicator expands to an extent proportional to an on-screen distance between the first location and the second location;
    wherein presenting the first animation routine further comprises: accelerating the focus indicator during the first portion of the path; and decelerating the focus indicator during the second portion of the path;
    determining that the input focus has shifted, during the first animation routine, from the second location to a third location within the graphical user interface;
    responsive to the determination, indicating a path from an intermediate location to the third location, wherein indicating the path from the intermediate location to the third location further comprises interrupting the first animation routine and presenting a second animation routine in which the focus indicator traverses the path from the intermediate location to the third location;
    accelerating the expansion of the focus indicator in further response to the determination that the input focus has shifted during the first animation routine, indicating that multiple focus shifts have been initiated; and
    displaying the focus indicator at a static location.

2. The method of claim 1, wherein the location of input focus shifts in response to an input.

3. The method of claim 2, wherein the input is received from a user.

4. The method of claim 1, wherein the location of input focus shifts in response to a request from an application associated with the graphical user interface.

5. The method of claim 1, wherein the location of input focus shifts in response to a timing event.

6. The method of claim 1, wherein presenting the first animation routine further comprises:
    calculating a first data structure corresponding to the focus indicator at the first location;
    calculating a second data structure corresponding to the focus indicator at the second location; and
    calculating a third data structure corresponding to the focus indicator at an intermediate location.

7. The method of claim 6, wherein calculating the third data structure corresponding to the focus indicator at the intermediate location comprises:
    calculating the third data structure based on factors including the first data structure corresponding to the focus indicator at the first location, the second data structure corresponding to the focus indicator at the second location, and a time corresponding to a pre-defined delay between an appearance of the focus indicator at the first location and an appearance of the focus indicator at the second location.

8. The method of claim 6, wherein a data structure defines a graphical element.

9. The method of claim 1, wherein a duration of time for which the focus indicator is visible to the user when the focus indicator is in a static position is adjustable.

10. The method of claim 1, wherein the focus indicator accelerates to a maximum speed during the first portion of the path, the maximum speed proportional to an on-screen distance between the first location and the second location.

11. The method of claim 1, wherein the focus indicator comprises four graphical elements corresponding to the four vertices of a rectangle circumscribing a location having input focus.

12. The method of claim 1, wherein the focus indicator comprises a graphical element corresponding to an ellipse circumscribing a location having input focus.

13. The method of claim 1, wherein the focus indicator comprises a graphical element corresponding to a circle circumscribing a location having input focus.

14. The method of claim 1, wherein the focus indicator comprises a plurality of graphical elements surrounding a location having input focus.

15. The method of claim 14, the first and second animation routines further comprising:
displaying the graphical elements of the focus indicator as separating and moving away from the first location; and
displaying the graphical elements of the focus indicator as converging and surrounding the third location.

16. The method of claim 14, the first and second animation routines further comprising:
displaying the graphical elements of the focus indicator as sequentially separating and moving away from the first location towards the second location; and
displaying the graphical elements of the focus indicator as sequentially positioning themselves so as to surround the third location.

17. The method of claim 14, the second animation routine further comprising:
displaying the graphical elements of the focus indicator as flowing as a contiguous mass such that they traverse the path and subsequently proceed along the outline of the third location until they have surrounded the third location.

18. The method of claim 1, wherein the focus indicator comprises a magnification of a location having input focus relative to other locations within the graphical user interface; and
wherein indicating the path from the first location to the second location comprises presenting an animation routine, the animation routine comprising displaying the focus indicator as traversing the path.

19. The method of claim 1, wherein indicating the path from the first location to the second location comprises displaying one or more lines between the first location and the second location.

20. A computer program product for indicating a location of an input focus within a graphical user interface, the computer program product stored on a non-transitory computer-readable storage medium and including program code for causing a processor to execute the steps of:
displaying a focus indicator at a first location within the graphical user interface, the first location having input focus, the focus indicator substantially surrounding the first location;
responsive to the location of input focus shifting from the first location to a second location within the graphical user interface, indicating a path from the first location to the second location by presenting a first animation routine in which the focus indicator traverses the path and further comprising expanding the focus indicator during a first portion of the path and contracting the focus indicator during a second portion of the path, wherein the focus indicator expands to an extent proportional to an on-screen distance between the first location and the second location;
wherein presenting the first animation routine further comprises: accelerating the focus indicator during the first portion of the path; and decelerating the focus indicator during the second portion of the path;
determining that the input focus has shifted, during the first animation routine, from the second location to a third location within the graphical user interface;
responsive to the determination, indicating a path from an intermediate location to the third location, wherein indicating the path from the intermediate location to the third location further comprises interrupting the first animation routine and presenting a second animation routine in which the focus indicator traverses the path from the intermediate location to the third location;
accelerating the expansion of the focus indicator in further response to the determination that the input focus has shifted during the first animation routine, indicating that multiple focus shifts have been initiated; and displaying the focus indicator at a static location.

21. The computer program product of claim 20, wherein the location of input focus shifts in response to an input.

22. The computer program product of claim 21, wherein the input is received from a user.

23. The computer program product of claim 20, wherein the location of input focus shifts in response to a request from an application associated with the graphical user interface.

24. The computer program product of claim 20, wherein the location of input focus shifts in response to a timing event.

25. The computer program product of claim 20, wherein presenting the first animation routine further comprises:
calculating a first data structure corresponding to the focus indicator at the first location;
calculating a second data structure corresponding to the focus indicator at the second location; and
calculating a third data structure corresponding to the focus indicator at an intermediate location.

26. The computer program product of claim 25, wherein calculating the third data structure corresponding to the focus indicator at the intermediate location comprises:
calculating the third data structure based on factors including the first data structure corresponding to the focus indicator at the first location, the second data structure corresponding to the focus indicator at the second location, and a time corresponding to a pre-defined delay between an appearance of the focus indicator at the first location and an appearance of the focus indicator at the second location.

27. The computer program product of claim 25, wherein a data structure defines a graphical element.

28. The computer program product of claim 20, wherein a duration of time for which the focus indicator is visible to the user when the focus indicator is in a static position is adjustable.

29. The computer program product of claim 20, wherein the focus indicator accelerates to a maximum speed during the first portion of the path, the maximum speed proportional to an on-screen distance between the first location and the second location.

30. The computer program product of claim 20, wherein the focus indicator comprises four graphical elements corresponding to the four vertices of a rectangle circumscribing a location having input focus.

31. The computer program product of claim 20, wherein the focus indicator comprises a graphical element corresponding to an ellipse circumscribing a location having input focus.

32. The computer program product of claim 20, wherein the focus indicator comprises a graphical element corresponding to a circle circumscribing a location having input focus.

33. The computer program product of claim 20, wherein the focus indicator comprises a plurality of graphical elements surrounding a location having input focus.

34. The computer program product of claim 33, the first and second animation routines further comprising:
    displaying the graphical elements of the focus indicator as separating and moving away from the first location; and
    displaying the graphical elements of the focus indicator as converging and surrounding the third location.

35. The computer program product of claim 33, the first and second animation routines further comprising:
    displaying the graphical elements of the focus indicator as sequentially separating and moving away from the first location towards the second location; and
    displaying the graphical elements of the focus indicator as sequentially positioning themselves so as to surround the third location.

36. The computer program product of claim 33, the second animation routine further comprising:
    displaying the graphical elements of the focus indicator as flowing as a contiguous mass such that they traverse the path and subsequently proceed along the outline of the third location until they have surrounded the third location.

37. The computer program product of claim 20, wherein the focus indicator comprises a magnification of a location having input focus relative to other locations within the graphical user interface; and
    wherein indicating the path from the first location to the second location comprises presenting an animation routine, the animation routine comprising displaying the focus indicator as traversing the path.

38. The computer program product of claim 20, wherein indicating the path from the first location to the second location comprises displaying one or more lines between the first location and the second location.

39. A system for indicating a location of an input focus within a graphical user interface, the system comprising:
    first displaying means for displaying a focus indicator at a first location within the graphical user interface, the first location having input focus, the focus indicator substantially surrounding the first location; and
    second displaying means, coupled to the first displaying means, for:
    responsive to the location of input focus shifting from the first location to a second location within the graphical user interface, indicating a path from the first location to the second location by presenting a first animation routine in which the focus indicator traverses the path and further comprising expanding the focus indicator during a first portion of the path and contracting the focus indicator during a second portion of the path, wherein the focus indicator expands to an extent proportional to an on-screen distance between the first location and the second location;
    wherein presenting the first animation routine further comprises: accelerating the focus indicator during the first portion of the path; and decelerating the focus indicator during the second portion of the path;
    determining that the input focus has shifted, during the first animation routine, from the second location to a third location within the graphical user interface;
    responsive to the determination, indicating a path from an intermediate location to the third location, wherein indicating the path from the intermediate location to the third location further comprises interrupting the first animation routine and presenting a second animation routine in which the focus indicator traverses the path from the intermediate location to the third location;
    accelerating the expansion of the focus indicator in further response to the determination that the input focus has shifted during the first animation routine, indicating that multiple focus shifts have been initiated; and
    displaying the focus indicator at a static location.

40. The system of claim 39, wherein the means for presenting the first animation routine further comprises:
    first calculating means for calculating a first data structure corresponding to the focus indicator at the first location;
    second calculating means for calculating a second data structure corresponding to the focus indicator at the second location; and
    third calculating means in communication with the first and second calculating means for calculating a third data structure corresponding to the focus indicator at the intermediate location.

41. The system of claim 40, wherein the third calculating means further comprises:
    fourth calculating means for calculating the third data structure based on factors including the first data structure corresponding to the focus indicator at the first location, the second data structure corresponding to the focus indicator at the second location, and a time corresponding to a pre-defined delay between an appearance of the focus indicator at the first location and an appearance of the focus indicator at the second location.

42. The method of claim 1, wherein the static location is the third location.

* * * * *